US011399352B2

(12) United States Patent
Patil et al.

(10) Patent No.: US 11,399,352 B2
(45) Date of Patent: Jul. 26, 2022

(54) RECEPTION OF MANAGEMENT FRAMES FOR MULTIPLE BASIC SERVICES SETS (BSSS)

(71) Applicant: QUALCOMM Incorporated, San Diego, CA (US)

(72) Inventors: Abhishek Pramod Patil, San Diego, CA (US); Yongchun Xiao, San Jose, CA (US); Ravi Gidvani, Fremont, CA (US); Sandip HomChaudhuri, San Jose, CA (US); Pradeep Kumar Yenganti, Fremont, CA (US); Arul Davidson Emmanuel, Chennai (IN); James Simon Cho, Mountain View, CA (US); Padmanabhan Venkataraman Karthic, Chennai (IN); George Cherian, San Diego, CA (US); Alfred Asterjadhi, San Diego, CA (US); Jouni Kalevi Malinen, Tuusula (FI)

(73) Assignee: QUALCOMM Incorporated, San Diego, CA (US)

( * ) Notice: Subject to any disclaimer, the term of this patent is extended or adjusted under 35 U.S.C. 154(b) by 403 days.

(21) Appl. No.: 16/505,506

(22) Filed: Jul. 8, 2019

(65) Prior Publication Data

US 2020/0015181 A1    Jan. 9, 2020

(30) Foreign Application Priority Data

Jul. 9, 2018  (IN) ............................. 201841025518

(51) Int. Cl.
*H04W 56/00* (2009.01)
*H04W 84/12* (2009.01)
*H04L 5/00* (2006.01)

(52) U.S. Cl.
CPC ....... *H04W 56/0005* (2013.01); *H04L 5/0096* (2013.01); *H04W 56/0015* (2013.01); *H04W 84/12* (2013.01)

(58) Field of Classification Search
CPC ......... H04W 56/0005; H04W 56/0015; H04W 84/12; H04L 5/0096
See application file for complete search history.

(56) References Cited

U.S. PATENT DOCUMENTS 10,524,290 B1 * 12/2019 Chu .................... H04L 27/0006
2008/0144591 A1 * 6/2008 Jokela .................. H04W 48/12
370/338

(Continued)

FOREIGN PATENT DOCUMENTS

WO   WO-2018202600 A1 * 11/2018 ........ H04W 74/0816
WO   WO-2019166295 A1 *  9/2019 .......... H04W 72/121

*Primary Examiner* — Mehmood B. Khan
(74) *Attorney, Agent, or Firm* — Qualcomm Inc (DL) c/o DeLizio Law, PLLC

(57) ABSTRACT

This disclosure provides systems, methods, and apparatus, including computer programs encoded on computer-readable media, for analyzing management frames for multiple basic service sets (BSSs). In one aspect, a wireless node may obtain a first management frame from a wireless local area network (WLAN) apparatus, the WLAN apparatus operating multiple virtual access points (VAPs) respectively corresponding to multiple BSSs. The wireless node may determine whether the first management frame includes a BSS profile of a BSS associated with the wireless node based, at least in part, on an arrangement of a plurality of BSS profiles within one or more management frames. The wireless node may determine to further process the first management frame based, at least in part, on a determination that the first management frame includes the BSS profile of the BSS associated with the wireless node.

27 Claims, 7 Drawing Sheets

(56) References Cited

U.S. PATENT DOCUMENTS

2017/0359300 A1* 12/2017 Patil .................... H04L 61/1541
2018/0302923 A1* 10/2018 Patil .................. H04W 74/0833

* cited by examiner

500

510 — OBTAIN, BY A WIRELESS NODE, A FIRST MANAGEMENT FRAME FROM A WIRELESS LOCAL AREA NETWORK (WLAN) APPARATUS, THE WLAN APPARATUS OPERATING MULTIPLE VIRTUAL ACCESS POINTS (VAPs) RESPECTIVELY CORRESPONDING TO MULTIPLE BASIC SERVICE SETS (BSSs)

520 — DETERMINE WHETHER THE FIRST MANAGEMENT FRAME INCLUDES A BSS PROFILE OF A BSS ASSOCIATED WITH THE WIRELESS NODE BASED, AT LEAST IN PART, ON AN ARRANGEMENT OF A PLURALITY OF BSS PROFILES WITHIN ONE OR MORE MANAGEMENT FRAMES TRANSMITTED BY THE WLAN APPARATUS, THE BSS BEING ONE OF THE MULTIPLE BSSs AND THE BSS PROFILE BEING ONE OF THE PLURALITY OF BSS PROFILES

530 — DETERMINE TO FURTHER PROCESS THE FIRST MANAGEMENT FRAME BASED, AT LEAST IN PART, ON A DETERMINATION THAT THE FIRST MANAGEMENT FRAME INCLUDES THE BSS PROFILE ASSOCIATED WITH THE WIRELESS NODE

610 — OPERATE, AT A WIRELESS NODE, MULTIPLE VIRTUAL ACCESS POINTS (VAPs) ASSOCIATED WITH CORRESPONDING MULTIPLE BASIC SERVICE SETS (BSSs), THE MULTIPLE VAPs INCLUDING AT LEAST A FIRST VAP FOR A FIRST BASIC SERVICE SET (BSS) AND A PLURALITY OF OTHER VAPs FOR A PLURALITY OF OTHER BSSs

620 — DETERMINE AN ARRANGEMENT OF A PLURALITY OF BSS PROFILES ASSOCIATED WITH THE PLURALITY OF OTHER BSSs WITHIN ONE OR MORE MANAGEMENT FRAMES

630 — GENERATE THE ONE OR MORE MANAGEMENT FRAMES FOR TRANSMISSION BASED, AT LEAST IN PART, ON THE ARRANGEMENT OF THE PLURALITY OF BSS PROFILES

FIG. 6

RECEPTION OF MANAGEMENT FRAMES FOR MULTIPLE BASIC SERVICES SETS (BSSS)

CROSS-REFERENCE TO RELATED APPLICATIONS

This Patent Application claims priority to Indian Provisional Patent Application No. 201841025518 filed on Jul. 9, 2018, and assigned to the assignee hereof. The disclosure of the prior Application is considered part of and is incorporated by reference in this Patent Application.

TECHNICAL FIELD

This disclosure relates to the field of network communication, and more particularly to wireless local area networks.

DESCRIPTION OF THE RELATED TECHNOLOGY

An access point (AP) of a wireless local area network (WLAN) can enable wireless network access for a client device (also referred to as a station, or STA). The AP may provide a wireless coverage area used by one or more STAs to access the WLAN. A Basic Services Set (BSS) may be defined as one AP, the wireless channel configuration, and the set of STAs that are wirelessly associated with the AP. The wireless channel configuration may utilize a portion of a frequency band (such as a 2.4 GHz frequency band, a 5 GHz frequency band, etc.). Within each frequency band, there may be different channels which an AP may utilize as part of the wireless channel configuration. Furthermore, the AP may utilize more than one antenna. For example, an AP may utilize multiple-input-multiple-output (MIMO) communication in which multiple antennas transmit wireless signals.

Multiple APs may be used within the same geographical area to support larger quantities of STAs or to separate traffic among groups of STAs. In the past, a single WLAN apparatus may have hosted only one BSS (associated with one AP). The BSS may be associated with a BSS identifier (BSSID). Recently, a single WLAN apparatus may be configured to host multiple BSSs (each BSS associated with a virtual AP) from the same WLAN apparatus. Each BSS may be associated with a different BSSID.

SUMMARY

The systems, methods, and devices of this disclosure each have several innovative aspects, no single one of which is solely responsible for the desirable attributes disclosed herein.

One innovative aspect of the subject matter described in this disclosure can be implemented by a wireless node. The wireless node may include an interface configured to obtain a first management frame from a wireless local area network (WLAN) apparatus. The WLAN apparatus may operate multiple virtual access points (VAPs) respectively corresponding to multiple basic service sets (BSSs). The wireless node may include a first processor configured to determine whether the first management frame includes a BSS profile of a BSS associated with the wireless node based, at least in part, an arrangement of a plurality of BSS profiles within one or more management frames transmitted by the WLAN apparatus. The BSS may be one of the multiple BSSs, and the BSS profile may be one of the plurality of BSS profiles. The first processor of the wireless node may determine to further process the first management frame based, at least in part, on a determination that the first management frame includes the BSS profile of the BSS associated with the wireless node.

In some implementations, the wireless node may determine to discard the first management frame without further processing the first management frame based, at least in part, on a determination that the first management frame does not include the BSS profile of the BSS associated with the wireless node.

In some implementations, in response to the determination that the first management frame includes the BSS profile of the BSS associated with the wireless node, the wireless node may determine whether the BSS profile of the BSS has changed compared to a previous instance of the BSS profile that was included in a previously received management frame. The wireless node may determine to further process the first management frame in response to a determination that the BSS profile has changed compared to the previous instance of the BSS profile.

In some implementations, the wireless node may determine to discard the first management frame without further processing the first management frame in response to a determination that the BSS profile has not changed compared to the previous instance of the BSS profile.

In some implementations, the wireless node may determine the first management frame includes the BSS profile of the BSS based, at least in part, on a repeating pattern of the plurality of BSS profiles included across a repeating sequence of management frames transmitted by the WLAN apparatus.

In some implementations, the wireless node may monitor management frames transmitted by the WLAN apparatus, and may determine a repeating pattern of the plurality of BSS profiles included across a repeating sequence of the management frames transmitted by the WLAN apparatus based on the monitoring of the management frames. The wireless node may determine the first management frame includes the BSS profile of the BSS based, at least in part, on the repeating pattern of the plurality of BSS profiles included across the repeating sequence of the management frames.

In some implementations, the wireless node may determine the first management frame includes the BSS profile of the BSS based, at least in part, on a determination that the first management frame is a Delivery Traffic Indication Message (DTIM) management frame.

In some implementations, the wireless node may determine a DTIM interval associated with the BSS profile of the BSS associated with the wireless node, and may determine a repeating pattern of transmission of management frames that include the BSS profile of the BSS based, at least in part, on the DTIM interval. The wireless node may determine the first management frame includes the BSS profile of the BSS based, at least in part, on a determination that the first management frame is one of the management frames in the repeating pattern of transmission of management frames that include the BSS profile of the BSS.

In some implementations, the wireless node may determine to wake up a host processor to further process the first management frame.

In some implementations, in response to the determination that the first management frame includes the BSS profile of the BSS associated with the wireless node, the wireless node may determine whether the BSS profile is split between a first Multiple BSSID element of the first management frame and a second Multiple BSSID element of the first management frame.

In some implementations, the wireless node may determine the first Multiple BSSID element or the second Multiple BSSID element includes an indicator element that indicates the BSS profile is split between the first Multiple BSSID element and the second Multiple BSSID element.

In some implementations, the wireless node may determine the first management frame includes at least a subset of the plurality of BSS profiles based, at least in part, on the arrangement of the plurality of BSS profiles within one or more management frames transmitted by the WLAN apparatus, where the subset of the plurality of BSS profiles includes the BSS profile.

In some implementations, in response to the determination that the first management frame includes the BSS profile of the BSS associated with the wireless node, the wireless node may identify a first indicator element in a first portion of the BSS profile included in a first Multiple BSSID element of the first management frame, where the first indicator element indicates a start of the BSS profile. The wireless node may determine a second portion of the BSS profile included in a second Multiple BSSID element of the first management frame does not include an indicator element. The wireless node may identify a second indicator element in a next BSS profile included in the second Multiple BSSID element, where the second indicator element indicates a start of the next BSS profile. The wireless node may determine the BSS profile is split between the first Multiple BSSID element and the second Multiple BSSID element based, at least in part, on an identification of the first indicator element, an identification of the second indicator element, and a determination that the second portion of the BSS profile included in the second Multiple BSSID element does not include an indicator element.

In some implementations, the wireless node may be configured as a station. The wireless node may include a receiver configured to receive the first management frame.

Another innovative aspect of the subject matter described in this disclosure can be implemented by a wireless node. The wireless node may include a processor configured to operate multiple virtual access points (VAPs) associated with corresponding multiple basis service sets (BSSs), where the multiple VAPs include at least a first VAP for a first BSS and a plurality of other VAPs for a plurality of other BSSs. The processor of the wireless node may determine an arrangement of a plurality of BSS profiles associated with the plurality of other BSSs within one or more management frames, and may generate the one or more management frames based, at least in part, on the arrangement of the plurality of BSS profiles. The wireless node may include an interface configured to output the one or more management frames for transmission to one or more wireless local area network (WLAN) apparatuses associated with the first BSS and at least one of the plurality of other BSSs.

In some implementations, the wireless node may determine a repeating pattern of the plurality of BSS profiles to be included across a repeating sequence of management frames, and generate the repeating sequence of management frames for transmission via the interface.

In some implementations, the wireless node may determine DTIM intervals associated with the plurality of BSS profiles, and determine a repeating pattern of transmission of management frames based, at least in part, on the DTIM intervals, where each management frame of the repeating pattern of transmission of management frames includes one or more of the plurality of BSS profiles.

In some implementations, the wireless node may determine a same DTIM interval for each of the plurality of BSS profiles generate a DTIM management frame for transmission that includes the plurality of BSS profiles.

In some implementations, the wireless node may determine whether a first BSS profile of the plurality of BSS profiles has changed compared to a previous instance of the first BSS profile, where the first BSS profile is associated with a second BSS. The wireless node may determine to include the first BSS profile in a next management frame associated with the second BSS in response to determining the first profile has changed.

In some implementations, the wireless node may split a first BSS profile of the plurality of BSS profiles between a first Multiple BSSID element of a first management frame and a second Multiple BSSID element of the first management frame.

In some implementations, a first portion of the first BSS profile is included in the first Multiple BSSID element of the first management frame and a second portion of the first BSS profile is included in the second Multiple BSSID element of the first management frame.

In some implementations, the first portion of the first BSS profile included in the first Multiple BSSID element includes a first indicator element that indicates a start of the first BSS profile, the second portion of the first BSS profile included in the second Multiple BSSID element does not include an indicator element, and the second BSS profile included in the second Multiple BSSID element includes a second indicator element that indicates a start of the second BSS profile.

In some implementations, the first indicator element may be a first capabilities element associated with the first BSS profile, and the second indicator element may be a second capabilities element associated with the second BSS profile.

In some implementations, the wireless node may be configured as an access point. The wireless node may include a transmitter configured to transmit the one or more management frames.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

FIG. 5 depicts an example flowchart of a wireless node analyzing a received management frame.

FIG. 6 depicts an example flowchart of a wireless node preparing one or more management frames for transmission.

Like reference numbers and designations in the various drawings indicate like elements.

DETAILED DESCRIPTION

Figure 1:
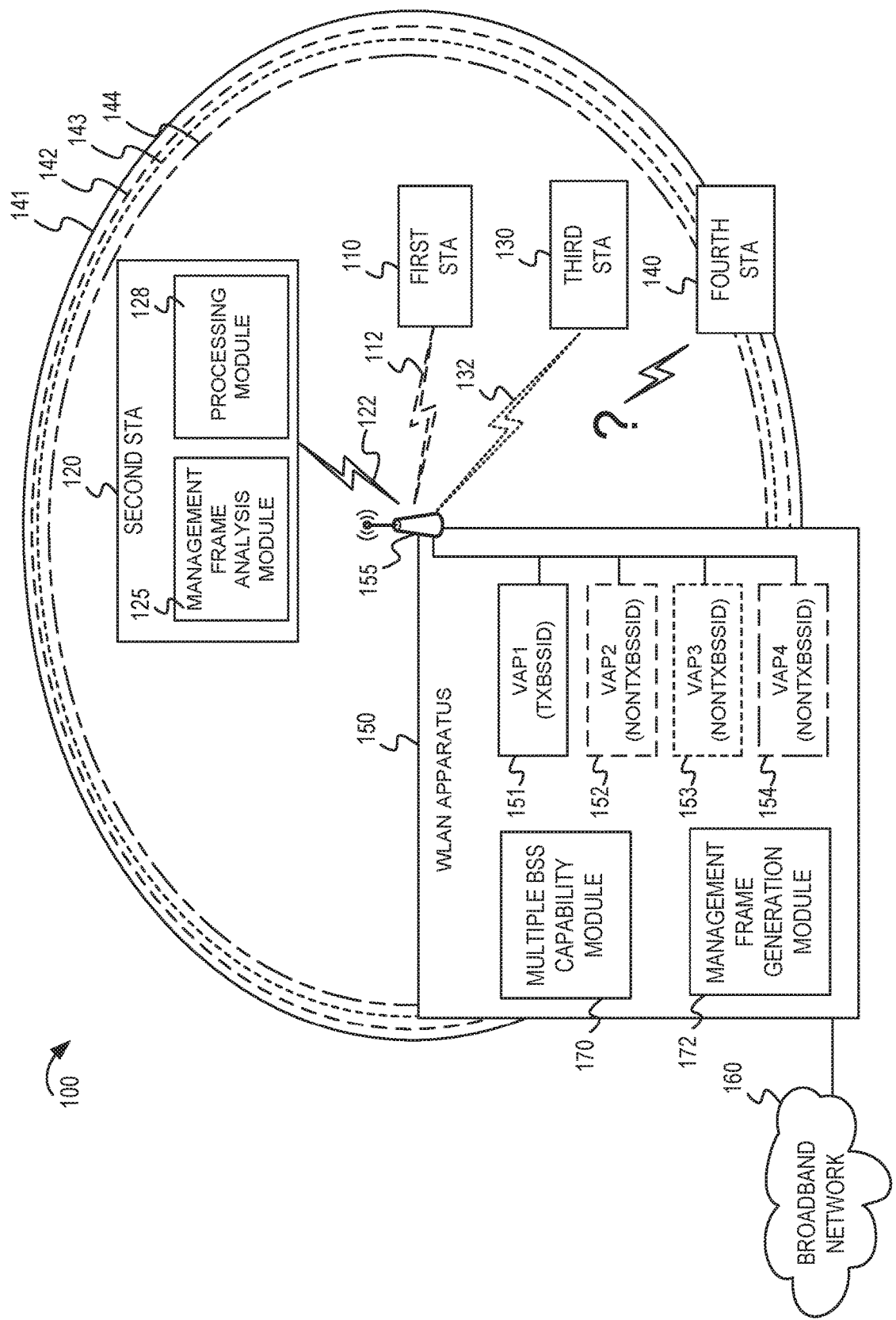
FIG. 1 depicts a system diagram of an example WLAN apparatus operating Multiple BSSs.

The following description is directed to certain implementations for the purposes of describing the innovative aspects of this disclosure. However, a person having ordinary skill in the art will readily recognize that the teachings herein can be applied in a multitude of different ways. The examples in this disclosure are based on wireless local area network (WLAN) communication according to the Institute of Electrical and Electronics Engineers (IEEE) 802.11 wireless standards. However, the described implementations may be implemented in any device, system or network that is capable of transmitting and receiving RF signals according to any communication standard, such as any of the IEEE 802.11 standards, the Bluetooth® standard, code division multiple access (CDMA), frequency division multiple access (FDMA), time division multiple access (TDMA), Global System for Mobile communications (GSM), GSM/ General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IoT) network, such as a system utilizing 3G, 4G, 5G, 6G, or further implementations thereof, technology.

Stations (STAs) in a WLAN can establish a wireless association (also referred to as a wireless link, wireless connection, or the like) with an access point (AP) to access the broadband network via the gateway device. The AP, the wireless channel configuration, and the set of STAs that are wirelessly associated with the AP are referred to as a Basic Services Set (BSS). Typically, an AP would transmit management frames (such as Beacon Frames or Probe Response Frames) to provide information about the BSS to any STAs in the vicinity of the AP. A wireless node or a wireless apparatus may refer to a WLAN device (whether an AP or a non-AP STA), or may refer to a wireless chipset of a WLAN device that manages and implements wireless communications.

A WLAN apparatus (such as an AP or a wireless node) may operate multiple virtual APs (VAPs) and each VAP may be associated with a different BSS. Operating a VAP for a BSS also may be referred to as hosting the BSS. Other terms may be used to represent the existence of a BSS (and corresponding VAP) at the WLAN apparatus, including having an active BSS, instantiating the BSS, implementing the BSS, or the like. Each BSS is associated with a different BSS identifier (BSSID). Multiple BSS capability may refer to a capability of a WLAN apparatus to advertise information for multiple BSSIDs using a single management frame (such as a Beacon Frame or Probe Response Frame) instead of using multiple Beacon or Probe Response Frames, each corresponding to a single BSSID. This has the advantage of reducing network overhead, while enabling multiple BSSs for traffic separation. For example, a first VAP (for a first BSS) may be designated as a primary source for management frames that advertise the information for the multiple BSSs, including one or more other BSSs in operation (being hosted) at the WLAN apparatus. Together, the multiple BSSs that are included in the single management frame signaling may be referred to as a Multiple BSSID set.

In a Multiple BSSID set, the BSSID of one VAP is referred to as the "transmitted BSSID" (or TxBSSID), and the BSSIDs of the rest of the VAPs are referred to as "nontransmitted BSSIDs" (or NonTxBSSIDs). The BSSID of the VAP that transmits the management frame for all of the VAPs of the multiple BSSID set is referred to as the TxBSSID. The BSSIDs of the VAPs that do not transmit the management frame are referred to as the NonTxBSSIDs. The VAPs corresponding to the NonTxBSSIDs (which may also be referred to as "NonTx VAPs") advertise information in the management frame transmitted by the VAP corresponding to the TxBSSID (which may also be referred to as the "Tx VAP"). In some implementations, the management frame may include an indication, such as a "MaxBSSID indicator," to signal a maximum quantity of contiguously numbered BSSIDs that could belong to a Multiple BSSID set. The MaxBSSID indicator may carry a value n that indicates that the Multiple BSSID set may include up to $2^n$ BSSIDs. For example, a MaxBSSID indicator having a value of four (4) may signal that a Multiple BSSID set may include up to sixteen (16) BSSIDs. The Multiple BSSID set may include less than sixteen BSSIDs.

A management frame transmitted by the Tx VAP may include a Multiple BSSID element that includes profile information (which may also be referred to as "BSS profiles" or "NonTxBSSID profiles") regarding the NonTxBSSIDs in the Multiple BSSID set. A STA may receive the management frame to learn about the TxBSSID and any of the other BSSs (NonTxBSSIDs) identified in the management frame. The management frame may include a partial list of the NonTxBSSID profiles in the Multiple BSSID set or a complete list of the NonTxBSSID profiles in the Multiple BSSID set. In some scenarios, the management frame may not be large enough (in terms of permitted transmission size) to include a complete list of the Non-TxBSSID profiles. The Tx VAP may signal one or more partial lists. For example, the first VAP may break the complete list of NonTxBSSIDs into different partial lists that are sent in consecutive management frames. In some implementations, the first VAP may include an indication of whether the management frame includes a complete list or a partial list. The first VAP may also inform the STA how many BSSIDs are actually implemented in the Multiple BSSID set. By knowing a quantity (or count) of BSSIDs in the Multiple BSSID set, the STA can unambiguously determine whether the STA has learned about all the BSSIDs in the Multiple BSSID set even if the STA has received one or more partial lists.

STAs may implement various forms of optimization techniques to save power when scanning for and analyzing management frames (such as Beacon Frames). When the WLAN apparatus (such as an AP) transmits management frames that advertise information for a single BSS (instead of Multiple BSSs) or the WLAN apparatus hosts a single BSS, the BSS configuration typically stays the same from one management frame to a subsequent management frame. As a result, the content of management frames typically remains unchanged for most management frames. A STA may implement one or more power save techniques when receiving a management frame associated with a BSS to determine whether the content of the management frame has changed. If the content of the management frame has not changed, the lower layers of the STA (such as hardware or firmware) may not wake up the host processor to parse the content of the management frame, and instead may discard or ignore the rest of the management frame. If the content of the management frame has changed, the lower layers of the STA (such as hardware or firmware) may wake up the host processor to parse the content of the management frame to determine how the BSS configuration has changed. Some example power save techniques that may be implemented by the STA include one or more of a Delivery Traffic Indication Message (DTIM) technique, an Early Beacon Termination (EBT) technique, and a selective processing technique. The DTIM technique may involve waking up the host processor only for DTIM management frames (such as DTIM Beacon Frames). The EBT technique may involve the STA skipping the further processing of a management frame based on the results of some initial checks (which may also be referred to as initial processing or preliminary processing) of one or more characteristics of the management frame. For example, the STA may check whether the length of the management frame is the same as the previously received management frame. Since having the same length as the previously received management frame may be assumed to mean that the content of the management frame is the same as the previously received management frame, the STA may skip further processing of the management frame (and therefore ignore or discard the management frame). In some implementations, the length of the management frame may be determined based on the duration field of the management frame. The selective processing technique may selectively process or analyze certain elements of a management frame. For example, the STA may include a decode engine that monitors if the content of certain elements of interest (which may also be referred to as essential elements) of the management frame have changed. If the content of the elements has not changed, then the STA may skip further processing of the management frame (and therefore ignore or discard the management frame).

The Multiple BSSID feature has resulted in several ambiguities which may affect the power save algorithms that are implemented for single BSS scenarios such that these power save techniques cannot be applied to Multiple BSS scenarios. For example, in the case of an AP that implements the Multiple BSSID feature, each management frame in a repeating sequence of two or more management frames may carry a different set of NonTxBSSID profiles. As a result, the content of every successive management frame may change, even though the BSS configuration with respect to one or more NonTxBSSID profiles has not changed. Thus, in some implementations, different power save algorithms may be utilized by APs and STAs that implement the multiple BSSID feature.

In accordance with this disclosure, a WLAN apparatus (such as an AP or any type of wireless node) that supports the Multiple BSSID feature may implement frame generation techniques when preparing and transmitting management frames (such as Beacon Frames) having a Multiple BSSID set that may result in power savings at the receiving STAs. In some implementations, the WLAN apparatus may prepare and transmit DTIM management frames (such as DTIM Beacon Frames) that include the same set of NonTxBSSID profiles. The set of NonTxBSSID profiles may have the same DTIM interval in order to generate DTIM management frames that include the same set of NonTxBSSID profiles. In some implementations, the WLAN apparatus may prepare and transmit a repeating sequence of management frames, where each management frame of the repeating sequence of management frames includes different NonTxBSSID profiles. For example, a first management frame in the repeating sequence of three management frames may include BSS profiles for a first NonTxBSSID, a second NonTxBSSID, and a third NonTxBSSID. A second management frame in the repeating sequence of three management frames may include BSS profiles for a fourth NonTxBSSID, a fifth NonTxBSSID, and a sixth NonTxBSSID. A third management frame in the repeating sequence of three management frames may include BSS profiles for a seventh NonTxBSSID, an eighth NonTxBSSID, and a ninth NonTxBSSID. Thus, the repeating sequence of management frames, each including different NonTxBSSID profiles, may be characterized as a repeating pattern of NonTxBSSID profiles across the multiple management frames. In some implementations, the WLAN apparatus may implement a hybrid approach of the two frame generation techniques described above. For example, the WLAN apparatus may ensure that the DTIM of a particular NonTxBSSID profile is a multiple of the repeating pattern of management frames. The WLAN apparatus may ensure that a particular NonTxBSSID profile is present in the management frame corresponding to the DTIM for that NonTxBSSID profile.

In accordance with this disclosure, a STA (or any time of wireless node) that supports the Multiple BSSID feature may implement power save techniques when receiving management frames (such as Beacon Frames) having a Multiple BSSID set. In some implementations, the STA may disable EBT, and the firmware or hardware of the STA (such as a processing unit or controller that executes the firmware, which may generally be referred to as a processor) may parse the management frame to determine whether or not to wake up the host processor to perform further processing on the management frame. Performing initial checks (or initial processing) at the lower layers may consume less power compared to running the host processor. In some implementations, the STA may perform initial checks on the management frame to determine one or more frame characteristics that may indicate whether the management frame includes the NonTxBSSID profile corresponding to the BSS associated with the STA. If the management frame includes the NonTxBSSID profile associated with the STA, the STA may then determine whether the NonTxBSSID profile has changed compared to the previously received instance of the NonTxBSSID profile. In some implementations, when the AP includes the NonTxBSSID profile associated with the STA in DTIM management frames, the STA may ignore or discard non-DTIM management frames to save power, and may perform EBT on DTIM management frames to determine whether or not to wake up the host processor to perform additional processing on the management frame. For example, the STA may perform initial checks to determine whether a management frame is a DTIM management frame. When the STA receives a DTIM management frame, the STA may perform additional checks, such as comparison operations that determines whether the NonTxBSSID profile associated with the STA has changed compared to the previously received instance of the NonTxBSSID profile. For example, the STA may compare the length of the DTIM management frame to the length of the previously received DTIM management frame. The STA may also perform a hash comparison operation that compares the hash results associated with the DTIM management frame to the hash results of the previously received DTIM management frame. In some implementations, the STA may read counter values, sequence numbers, or other types of indicators that the WLAN apparatus includes in a management frame for each of the NonTxBSSIDs to indicate whether any of the profile information associated with any of the NonTxBSSID profiles has changed. For example, when the WLAN apparatus prepares a management frame for transmission, it may determine that profile information of a first NonTxBSSID profile has changed, and determine that profile information of a second NonTxBSSID profile has not changed. Therefore, in this example, the WLAN apparatus would change the counter value, sequence number, or other indicator for the first NonTxBSSID profile to indicate the profile information has changed, and the WLAN apparatus would not change the counter value, sequence number, or other indicator for the first NonTxBSSID profile to indicate the profile information has not changed. With the above schemes, the STA associated with a particular VAP can check the respective management frame to see if there is a change to the configuration of its associated BSS.

In accordance with this disclosure, the WLAN apparatus (or any type of wireless node) may generate and transmit a management frame having a split NonTxBSSID profile (which may also be referred to as a straddled NonTxBSSID profile) across two or more Multiple BSSID elements of the management frame. For example, the WLAN apparatus may include one or more complete NonTxBSSID profiles for a corresponding one or more NonTxBSSIDs, and a partial NonTxBSSID profile (which may be referred to as a first portion of the profile) for another NonTxBSSID, in a first Multiple BSSID element of the management frame. The WLAN apparatus may also include a partial NonTxBSSID profile (which may be referred to as a second portion of the profile, or the remaining portion of the profile that was not included in the first Multiple BSSID element) in a second Multiple BSSID element of the management frame. Thus, the management frame includes a NonTxBSSID profile that is split into a first portion and a second portion across the first and second Multiple BSSID elements. In some implementations, the WLAN apparatus may include an indication in one or more of the Multiple BSSID elements of the management frame that indicates the management frame includes a split NonTxBSSID profile.

Particular implementations of the subject matter described in this disclosure can be implemented to realize one or more of the following potential advantages. A WLAN apparatus that supports the Multiple BSSID feature can implement frame generation techniques for preparing and transmitting management frames that aid receiving STAs to implement power saving techniques for receiving, analyzing, and processing the management frames. The power saving techniques implemented by the STA may perform one or more initial checks on a received management frame to save power. Based on the initial checks, the STA may determine whether to ignore (or discard) the management frame, which saves power by not fully processing the management frame, or whether to wake up the host processor to further process the management frame. The WLAN apparatus may also implement split NonTxBSSID profiles to better utilize element size limitations. For example, instead of leaving some unused bytes (or not utilizing the maximum number of bytes) in a Multiple BSSID element and adding a profile in the next element, the WLAN apparatus may use the bytes for a first portion of the profile and add the second portion of the profile in the next Multiple BSSID element.

FIG. 1 depicts a system diagram of an example WLAN apparatus operating Multiple BSSs. The system diagram 100 includes a WLAN apparatus 150 which is communicatively coupled to a broadband network 160. The WLAN apparatus 150 may be communicatively coupled (or co-located) with a gateway device (not shown). A gateway device, such as a modem or router, may provide access to the broadband network 160. For example, the gateway device can couple to the broadband network through a cable, a fiber optic, a powerline, or DSL network connection. The WLAN apparatus 150 may be an AP (or any type of wireless node) that hosts multiple VAPs, such as a first VAP 151, a second VAP 152, a third VAP 153, and a fourth VAP 154. The first VAP 151 is providing a first coverage area 141. Similarly, the second VAP 152 provides a second coverage area 142, the third VAP 153 provides a third coverage area 143, and the fourth VAP 154 provides a fourth coverage area 144. For illustration purposes, the first coverage area 141, second coverage area 142, third coverage area 143, and fourth coverage area 144 are shown as different size ovals in the diagram. However, the sizes of the coverage areas may be similar to each other and the shapes of the coverage areas may vary as a result of environmental obstructions or interference. The WLAN apparatus 150 may have one or more antennas 155. In some implementations, the VAPs 151, 152, 153, and 154 may share the same one or more antennas 155.

In FIG. 1, each of the VAPs 151, 152, 153, and 154 are associated with different BSSIDs and are part of a Multiple BSSID set. Each BSS can have different wireless associations with client stations (STAs). A STA can establish a wireless association (also referred to as a wireless link, wireless connection, or the like) with a VAP to access the broadband network via the WLAN apparatus 150. In FIG. 1, a first STA 110 has a first wireless association 112 with a first BSSID (corresponding to the first VAP 151). A second STA 120 has a second wireless association 122 with a second BSSID (corresponding to the second VAP 152). A third STA 130 has a third wireless association 132 with a third BSSID (corresponding to the third VAP 153).

In some scenarios, a fourth STA 140 may enter the vicinity of the WLAN apparatus 150 and may attempt to establish a wireless association with one of the VAPs 151, 152, 153, or 154. The fourth STA 140 may observe a management frame (such as a Beacon Frame or Probe Response Frame) to determine the BSSID(s) available from the WLAN apparatus 150. For example, the first VAP 151 may periodically broadcast a Beacon Frame. In some implementations, the fourth STA 140 may transmit a Probe Request Frame to the WLAN apparatus 150 to request a Probe Response Frame. The management frame (whether it is a Beacon Frame, a Probe Response Frame, or some other management frame) received from the WLAN apparatus 150 may indicate the TxBSSID of the first VAP 151. Furthermore, the management frame may indicate some or all of the NonTxBSSIDs of the other BSSs (corresponding to VAPs 152, 153, and 154) being hosted by the WLAN apparatus 150. The fourth STA 140 may determine whether to establish a wireless association with the VAP 151, the VAP 152, the VAP 153, or the VAP 154 based on one or more management frames received from the WLAN apparatus 150.

In some implementations, the first VAP 151 may periodically broadcast a management frame, such as a Beacon Frame. The management frame may indicate the TxBSSID of the first VAP 151. Furthermore, the management frame may indicate some or all of the NonTxBSSIDs of the other BSSs (corresponding to VAPs 152, 153, and 154) being hosted by the WLAN apparatus 150. In some implementations, the WLAN apparatus 150 may have a Multiple BSS Capability module 170 and a management frame generation module 172 to perform some of the operations described herein. For example, the Multiple BSS Capability module 170 may coordinate with the one or more of the VAPs 152, 153, and 154 and may store the BSSIDs for the Multiple BSSID Set. The management frame generation module 172 may prepare (or generate) the management frames for the Multiple BSSID Set for transmission. In some implementations, the management frame generation module 172 may implement frame generation techniques to prepare management frames that include some or all of the NonTxBSSID profiles of the BSSs corresponding to the VAPs 152, 153, and 154, as will be further described below. For example, the management frame generation module 172 may generate a first management frame having a Multiple BSSID element that includes a first NonTxBSSID profile of a second BSS corresponding to the second VAP 152 and a second NonTxBSSID profile of a third BSS corresponding to the third VAP 153. The WLAN apparatus 150 may also generate a second management frame having a Multiple BSSID element that includes a third NonTxBSSID profiles of a fourth BSS corresponding to the fourth VAP 154. In some implementations, the Multiple BSS Capability module 170 and the management frame generation module 172 may be part of a wireless chipset of the WLAN apparatus 150. In some implementations, the wireless chipset also may host, at least in part, the multiple VAPs, such as the first VAP 151, the second VAP 152, the third VAP 153, and the fourth VAP 154. A wireless chipset also may be generally referred to as a wireless node, a wireless apparatus, or a communication unit (or module), and may perform some or all of the operations described in this disclosure for implementing and managing wireless communications for multiple BSSs.

In some implementations, each of the STAs 110, 120, 130, and 140 may include a management frame analysis module and a processing module. For example, as shown in FIG. 1, the second STA 120 may include a management frame analysis module 125 and a processing module 128. The STAs 110, 130, 140 may also each include a management frame analysis module and a processing module; however, these modules are not shown FIG. 1 for simplicity. The management frame analysis module 125 may implement power save techniques for analyzing received management frames, as will be further described below. For example, the management frame analysis module 125 may analyze a received management frame to determine whether to ignore (or discard) the received management frame and therefore save power, or whether to further process the received management frame using the processing module 128. In some implementations, a management frame analysis module and a processing module may be part of a wireless chipset of each STA. A wireless chipset also may be generally referred to as a wireless node, a wireless apparatus, or a communication unit (or module), and may perform some or all of the operations described in this disclosure for processing wireless communications that implement a Multiple BSSID feature. In some implementations, a processing module may include a host processor. In some implementations, a management frame analysis module may include hardware and firmware, such as a processor (which may be separate from the host processor) that may execute firmware to analyze a received management frame to determine whether to ignore (or discard) the received management frame or further process the received management frame.

In some implementations, the management frame generation module 172 of the WLAN apparatus 150 may prepare DTIM management frames (such as DTIM Beacon Frames) that include NonTxBSSID profiles for all of the NonTxBSSIDs supported by the WLAN apparatus 150. The set of NonTxBSSID profiles may have the same DTIM interval in order to generate DTIM management frames that include the same set of NonTxBSSID profiles. In some implementations, the management frame analysis module 125 of the STA 120 may implement a power save technique that performs one or more initial checks on the received management frame to identify a DTIM management frame and determine whether the NonTxBSSID profile associated with the STA 120 has changed. The management frame analysis module 125 may determine to check for DTIM management frames after monitoring management frames generated by the WLAN apparatus 150 and determining the DTIM management frames generated the WLAN apparatus 150 include NonTxBSSID profiles for all of the supported NonTxBSSIDs. Therefore, whether or not the management frame is a DTIM management frame is a frame characteristic the management frame analysis module 125 can check to determine whether the management frame will include the NonTxBSSID profile associated with the STA 120. The management frame analysis module 125 may ignore or discard non-DTIM management frames to save power, and may perform EBT on the DTIM management frame to determine whether or not to wake up the processing module 128 (which may include the host processor) to perform additional processing on the management frame. When performing EBT, the management frame analysis module 125 may perform a length comparison operation for the DTIM management frame. When the management frame analysis module 125 determines the length of the DTIM management frame is different than the length of the previously received DTIM management frame, then the management frame analysis module 125 may perform an additional comparison operation, such as a hash function of information in the Multiple BSSID element. For example, the management frame analysis module 125 may perform a hash function of certain profile information of the BSS profile associated with the STA 120 and compare the results of the hash function to the expected hash function results (such as the hash function results of a previously received DTIM management frame). If the hash function results are a match, then the DTIM management frame is ignored or discarded because the BSS profile likely has not changed. If the hash function results do not match, then the management frame analysis module 125 may request the processing module 128 to perform further processing on the DTIM management frame. For example, the host processor may be further process the DTIM management frame to determine the change in the BSS configuration.

Figure 2A:
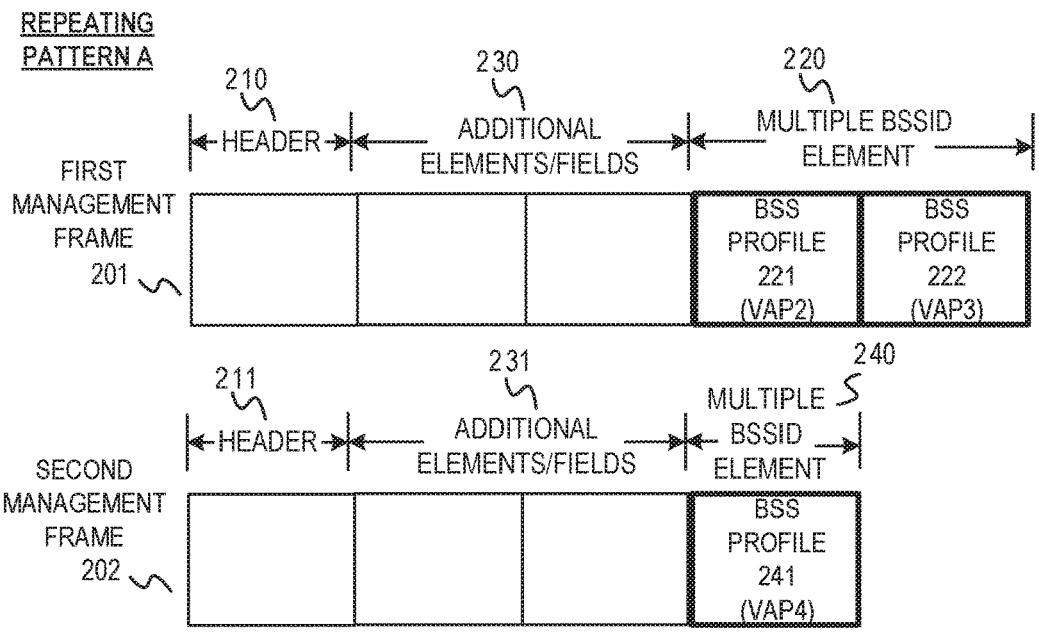
FIG. 2A depicts example of a repeating sequence of management frames that includes a repeating pattern of BSS profiles.

In some implementations, the management frame generation module 172 of the WLAN apparatus 150 may prepare a repeating sequence of management frames, where each management frame of the repeating sequence of management frames includes different NonTxBSSID profiles. For example, as shown in FIG. 2A, a first management frame 201 in the repeating sequence of two management frames may include a Multiple BSSID element 220 having a BSS profile 221 for a first NonTxBSSID associated with the VAP 152 (VAP2), and a BSS profile 222 for a second NonTxBSSID associated with the VAP 153 (VAP3). The first management frame 201 may also include a header 210 and additional elements/fields 230. The additional elements/fields 230 may include elements, fields, and other management information from the VAP 151 (VAP1) that can be inherited by the VAPs 152, 153, and 154. A second management frame 202 in the repeating sequence of two management frames may include a Multiple BSSID element 240 having a BSS profile 241 for a third NonTxBSSID associated with the VAP 154 (VAP4). The second management frame 202 may also include a header 211 and additional elements/fields 231. Thus, the repeating sequence of management frames, each including different BSS profiles (which may also be referred to as NonTxBSSID profiles), may be characterized as a repeating pattern of BSS profiles across the multiple management frames. FIG. 2A illustrates a Repeating Pattern A, which includes the BSS profiles 221 and 222 in the first management frame 201 and the BSS profile 241 in the second management frame 202.

Figure 2B:
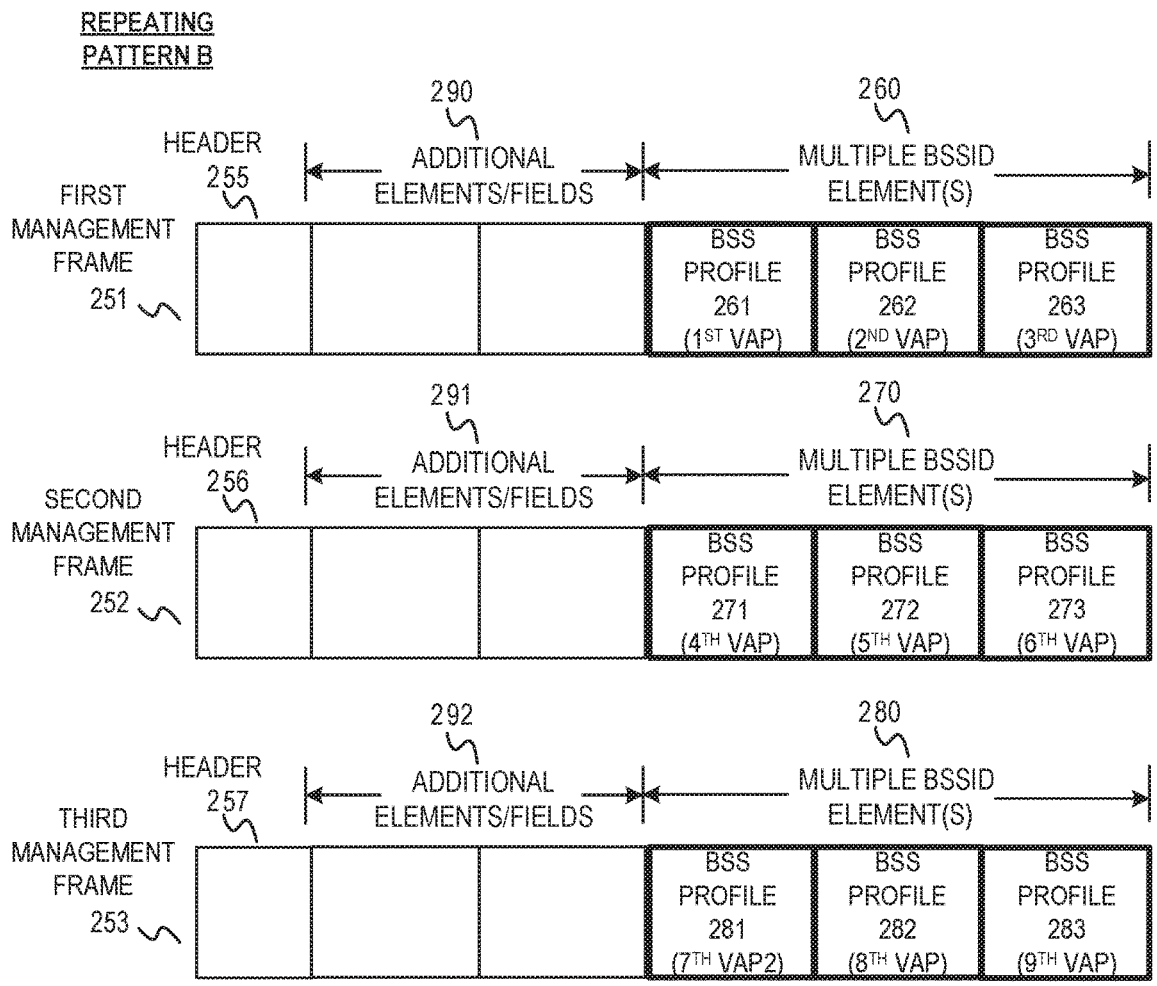
FIG. 2B depicts another example of a repeating sequence of management frames that includes a repeating pattern of BSS profiles.

In some implementations, the repeating pattern may be different than the example pattern shown in FIG. 2A for the system of FIG. 1. For example, FIG. 2B illustrates a Repeating Pattern B, which includes a repeating sequence of three management frames. The first management frame 251 in the repeating sequence of three management frames may include one or more Multiple BSSID elements 260 having a BSS profile 261 for a first NonTxBSSID associated with a first VAP, a BSS profile 262 for a second NonTxBSSID associated with a second VAP, and a BSS profile 263 for a third NonTxBSSID associated with a third VAP. The first management frame 251 may also include a header 255 and additional elements/fields 290. The second management frame 252 in the repeating sequence of three management frames may include one or more Multiple BSSID elements 270 having a BSS profile 271 for a fourth NonTxBSSID associated with a fourth VAP, a BSS profile 272 for a fifth NonTxBSSID associated with a fifth VAP, and a BSS profile 273 for a sixth NonTxBSSID associated with a sixth VAP. The second management frame 252 may also include a header 256 and additional elements/fields 291. The third management frame 253 in the repeating sequence of three management frames may include one or more Multiple BSSID elements 280 having a BSS profile 281 for a seventh NonTxBSSID associated with a seventh VAP, a BSS profile 282 for an eighth NonTxBSSID associated with an eighth VAP, and a BSS profile 283 for a ninth NonTxBSSID associated with a ninth VAP. The third management frame 253 may also include a header 257 and additional elements/fields 292. In FIG. 2B, the repeating sequence of management frames, each including different BSS profiles (which may also be referred to as NonTxBSSID profiles), may also be characterized as a repeating pattern of BSS profiles across the multiple management frames.

In some implementations, the management frame analysis module 125 of the STA 120 may monitor the management frames that are transmitted by the WLAN apparatus 150 to identify a repeating sequence of management frames having a repeating pattern of BSS profiles across the multiple management frames. The repeating pattern of BSS profiles may be referred to as a frame characteristic that can be detected by the management frame analysis module 125 to determine which management frame has the BSS profile associated with the STA 120. The management frame analysis module 125 may determine the first management frame 201 in the repeating sequence of management frames includes the BSS profile 221 of the NonTxBSSID 152 that is associated with the STA 120. Therefore, the management frame analysis module 125 may determine to monitor and analyze every first management frame in the sequence going forward. In some implementations, the management frame analysis module 125 may identify the repeating pattern and also which management frame has the BSS profile 221 associated with the STA 120 based on the Multiple BSSID Index element that is included in each BSS profile. Each BSS profile has a different value for the Multiple BSSID Index element, and thus the Multiple BSSID Index element may be considered a frame characteristic that can be used to identify a management frame that includes a particular BSS profile. In some implementations, after determining which management frame in the sequence includes the BSS profile associated with the STA 120, an expected length of the first management frame in the sequence may be stored for comparison to the length of subsequent instances of the first management frame. Also, a hash function may be performed based on information in the Multiple BSSID element of the first management frame in the sequence (such as profile information of the BSS profile associated with the STA 120) in order to determine and store an expected result of the hash function for comparison to subsequent instances of the first management frame. When the management frame analysis module 125 determines the length of the subsequent first management frame in the sequence (according to the repeating pattern) is the same as the expected length, then the management frame is ignored or discarded because the BSS profile likely has not changed. When the management frame analysis module 125 determines the length of the subsequent first management frame in the sequence (according to the repeating pattern) is different than the expected length, then the management frame analysis module 125 may perform an additional comparison operation, such as a hash function of information in the Multiple BSSID element. For example, the management frame analysis module 125 may perform a hash function of certain profile information of the BSS profile associated with the STA 120 and compare the hash function results to the expected hash function results. In some implementations, the profile information of the BSS profile that will be inputted into the hash function may be referred to as essential elements of the BSS profile that the STA wants to monitor. For example, a channel change announcement element may be considered an essential element. Other elements of the BSS profile that are not considered essential to the STA may be placed in a hash ignore list, such as a country element. If the hash function results are a match, then the management frame is ignored or discarded because the BSS profile likely has not changed. If the hash function results do not match, then the management frame analysis module 125 may request the processing module 128 to perform further processing on the management frame. For example, the host processor may be further process the management frame to determine the change in the BSS configuration.

In some implementations, the management frame analysis module 125 of the STA 120 may disable EBT, and instead may parse the management frame to determine whether or not to wake up the processing module 128 to perform further processing on the management frame. The management frame analysis module 125 may perform initial checks on the management frame to determine one or more frame characteristics that may indicate whether the management frame includes the BSS profile corresponding to the BSS associated with the STA 120. If the management frame includes the BSS profile associated with the STA 120, the management frame analysis module 125 may then determine whether the BSS profile has changed compared to the previously received instance of the BSS profile. For example, similarly as described above, the management frame analysis module 125 may perform a hash comparison operation that compares the hash results associated with the management frame to the hash results of a previously received management frame.

In some implementations, the management frame generation module 172 of the WLAN apparatus 150 may include a BSS profile of a particular NonTxBSSID in a management frame that is repeated according to the DTIM interval associated with the NonTxBSSID. For example, the BSS profile of the NonTxBSSID associated with the VAP 152 may include a DTIM interval of 5. With a DTIM interval of 5, the management frame generation module 172 may include the BSS profile associated with the VAP 152 in the management frame that is transmitted every $5^{th}$ beacon interval in order to be consistent with the DTIM interval. Thus, the repeating pattern for transmitting the BSS profile associated with the VAP 152 is every $5^{th}$ management frame in order to line up with the DTIM interval that has a value of 5 (that is, every $5^{th}$ beacon interval). In some implementations, the management frame analysis module 125 may determine the DTIM interval of the BSS profile associated with the VAP 152 to determine the repeating pattern of management frames that will include the BSS profile associated with the VAP 152. For example, the management frame analysis module 125 may determine the BSS profile is associated with a DTIM interval having a value of 5, which may indicate that the management frame analysis module 125 should monitor every $5^{th}$ management frame. Thus, the DTIM interval may also be considered a frame characteristic that can be checked by the management frame analysis module 125 to determine which management frames include a particular BSS profile. The management frame analysis module 125 may ignore or discard management frames that are not part of the repeating pattern indicated by the DTIM interval. For example, the STAs may wake up to receive and process management frames that are part of the repeating pattern indicated by the DTIM interval, and the STAs may not wake up for management frames that are not part of the repeating pattern indicated by the DTIM interval. The management frame analysis module 125 may perform EBT (such as length comparison operations, hash comparison operations, etc., as described above) on the management frames that are part of the repeating pattern indicated by the DTIM interval.

In some implementations, when the management frame analysis module 125 performs a hash function of the profile information of a particular BSS profile associated with a NonTxBSSID, the management frame analysis module 125 may also perform a hash function of certain essential elements that the STA 120 is monitoring in the TxBSSID. For example, the management analysis module 125 may perform a hash function of certain elements that the NonTxBSSID associated with the STA 120 is inheriting from the TxBSSID. The result of the hash function may indicate to the STA 120 whether the inherited elements that are being monitored by the STA 120 have changed from the previous instance of the management frame. In some implementations, when the STA 120 has detected a repeating pattern of management frames, or a DTIM interval, that indicates the BSS profile associated with the STA 120 will be located in, for example, the third beacon interval, the STA 120 may monitor the third management frame in a sequence of management frames. In some implementations, in addition to monitoring the BSS profile associated with the STA 120 that is included in the third management frame in the sequence, the management analysis module 125 may also monitor certain essential elements, such as inherited elements, in most or all of the management frames in the sequence (such as in the first, second, and third management frames in the sequence) by performing a hash function, as described above, on certain essential elements that are inherited by the STA 120. In some implementations, the STA 120 may perform a first hash function comparison operation for the profile information of the BSS profile associated with the STA 120, and a separate hash function comparison operation for the essential elements, such as the elements that are inherited from the TxBSSID by the NonTxBSSID associated with the STA 120. In some implementations, the STA 120 may perform a single hash function comparison operation for both the profile information and the essential elements. For example, the STA 120 may perform an initial hash function of the profile information, and then the STA 120 may add as an addition input to the hash function the information from the essential elements (such as the inherited elements), and then compare the results as described above.

In some implementations, when the management frame generation module 172 of the WLAN apparatus 150 prepares a management frame for transmission, it may monitor which BSS profiles have changes compared to the previous instance of the BSS profiles in a previously transmitted management frame. For example, the frame generation module 172 may determine that profile information of a first BSS profile has changed, and determine that profile information of a second BSS profile has not changed. The frame generation module 172 may include a change indicator in each of the BSS profiles of the management frame that may indicate to a receiving STA (such as STA 120) whether the BSS profiles have changed from the previous instance of the BSS profiles. The change indicators may be counters, sequence numbers, or other types of indicators. When the frame generation module 172 determines a BSS profile has changed, the frame generation module 172 may update the change indicator associated with that particular BSS profile to indicate the configuration of the BSS profile has changed. For example, if the change indicator is a counter or a sequence number, the counter or sequence number may be incremented to indicate the BSS profile has changed.

When the frame generation module 172 determines a BSS profile has not changed, the frame generation module 172 may maintain the change indicator in its current state to indicate the configuration of the BSS profile has not changed. For example, if the change indicator is a counter or a sequence number, value of the counter or sequence number may be maintained (not updated) to indicate the BSS profile has not changed. In some implementations, when using the change indicators, the STA that receives the management frame can quickly determine whether any of the information in any of the BSS profiles has changed by reading the change indicators. For example, the management frame analysis module 125 of the STA 120 may read the change indicators to determine whether the configuration of the BSS profile associated with the STA 120 has changed. If the frame analysis module 125 determines the BSS profile has changed based on the change indicator, the STA 120 may determine to further process the management frame, similarly as described above. If the frame analysis module 125 determines the BSS profile has not changed based on the change indicator, the STA 120 may determine to discard or ignore the management frame.

In some implementations, the WLAN apparatus 150 may determine whether to include a BSS profile of a BSS in a next management frame associated with the BSS based on whether the BSS profile has changed compared to the previous instance of the BSS profile in a previously transmitted management frame. For example, if the BSS profile has changed, the WLAN device 150 may include the BSS profile in the next management frame associated with the BSS (even if its prior to the next corresponding management frame of a repeating sequence of management), so that the STAs of the BSS are quickly notified of the change in the BSS profile. If the BSS profile has not changed, the WLAN device 150 may wait to include the BSS profile in the next corresponding management frame of the repeating sequence of management frames. In some implementations, if the BSS profile has changed, the WLAN device 150 may include the BSS profile in the next DTIM management frame associated with the BSS. In some implementations, if the BSS profile has changed, the WLAN device 150 may include the BSS profile in the next DTIM management frame associated with the BSS, even if its prior to the next DTIM management frame of the corresponding DTIM interval. If the BSS profile has not changed, the WLAN device 150 may wait to include the BSS profile in the next DTIM management frame of the corresponding DTIM interval.

In some implementations, a management frame may include an indicator in the management frame to indicate whether a list of NonTxBSSIDs in that management frame is a complete list or a partial list of the other BSSs (corresponding to VAPs 152, 153, and 154) hosted by the WLAN apparatus 150. In some implementations, the first VAP 151 may transmit a partial list in a first management frame and another partial list in the next management frame. Therefore, a series of consecutive management frames may include portions of the complete list. In some implementations, a management frame may include an indicator having a defined value to inform the recipient (STA) whether or not the management frame is advertising a complete or partial list. For example, in some implementations, the indicator may be a single bit value to indicate that the management frame includes either a complete or partial list. In some implementations, a management frame may indicate a quantity (or count) of BSSIDs in the Multiple BSSID set. For example, the management frame may indicate a total quantity of the BSSIDs in the Multiple BSSID set, including the TxBSSID. In another example, the management frame may indicate a quantity of the NonTxBSSIDs in the Multiple BSSID set, not including the TxBSSID.

The types of management frames, profiles, element, and indicators are merely examples. In some other implementations, a different management frame, profiles, elements, and indicators may be used. In some implementations, the use of the indicators may be specified in a standard specification. For example, some implementations of the indicators may be mandated for IEEE 802.11ax devices.

Figure 3:
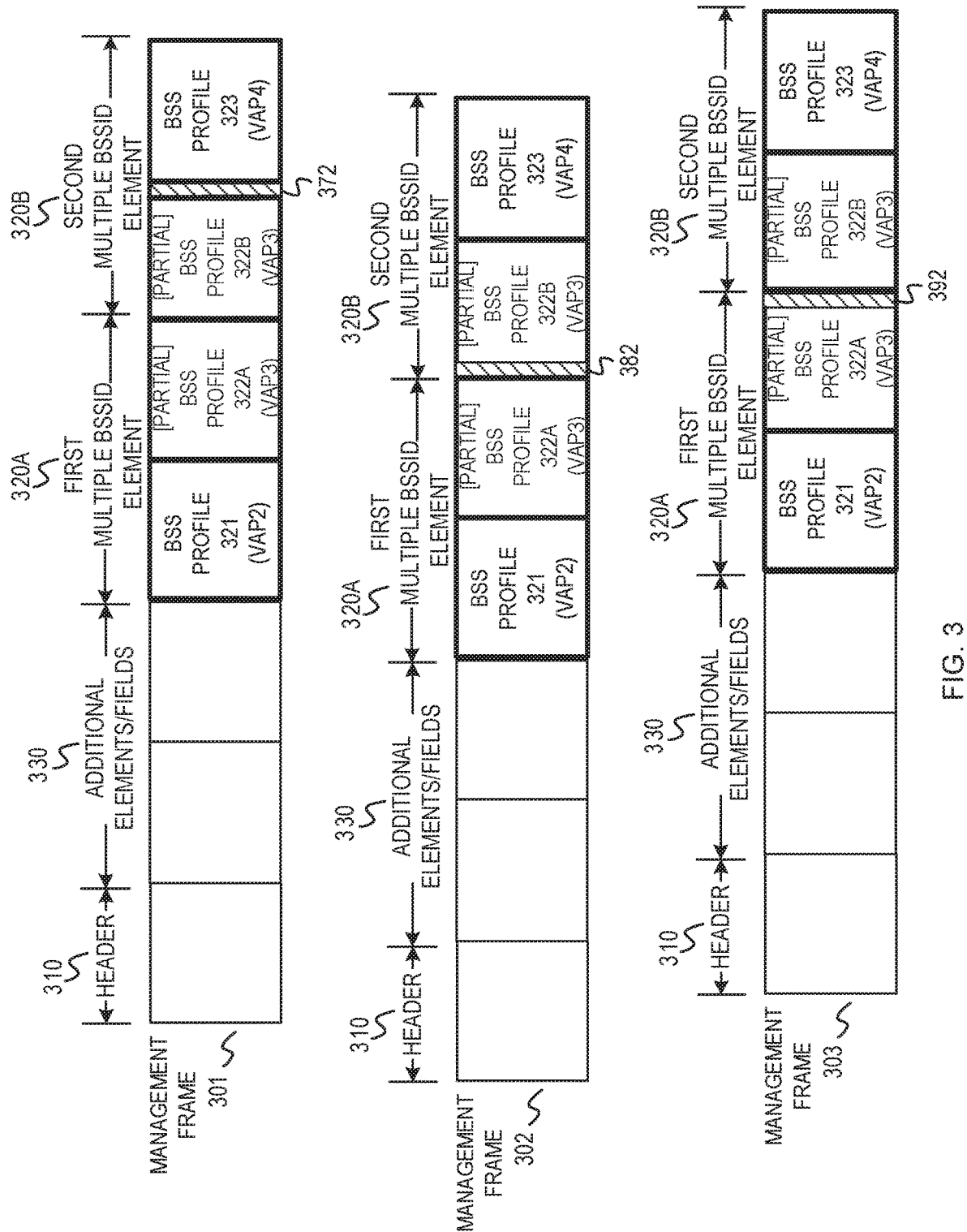
FIG. 3 depicts example management frames that include a split BSS profile across Multiple BSSID elements.

FIG. 3 depicts example management frames that include a split BSS profile across Multiple BSSID elements. In some implementations, the management frame generation module 172 of the WLAN apparatus 150 may generate a management frame 301 having a split BSS profile (which may also be referred to as a NonTxBSSID profile) across two or more Multiple BSSID elements of the management frame 301. A split BSS profile may also be referred to as a straddled BSS profile. As shown in the example management frame 301 of FIG. 3, the management frame generation module 172 may include a complete BSS profile 321 for the NonTxBSSID associated with the VAP 152, and a partial BSS profile 322A (which may also be referred to as a first portion of the BSS profile 322) for the NonTxBSSID associated with the VAP 153, in a first Multiple BSSID element 320A of the management frame 301. The management frame generation module 172 may also include a partial BSS profile 322B (which may also be referred to as a second portion of the BSS profile 322, or the remaining portion of the BSS profile 322 that was not included in the first Multiple BSSID element 320A) in a second Multiple BSSID element 320B of the management frame 301. The management frame 301 may also include a header 310 and additional elements/fields 330. Thus, the management frame 301 may include a BSS profile 322 that is split into a first portion (322A) and a second portion (322B) across the first Multiple BSSID element 320A and the second Multiple BSSID elements 320B.

When a BSS profile is split or straddled across two or more Multiple BSSID elements, the management frame generation module 172 may add an indicator (such as a fixed element or anchor element) that indicates the management frame includes a split BSS profile. An indicator may indicate to a STA that is parsing the split BSS profile in one of the Multiple BSSID elements to continue to parse the next Multiple BSSID element to process the remaining portion of the split profile. Without an indication that there is a split or straddled profile, the STA may ignore the next Multiple BSSID element. In some implementations, the indicator may be an existing element in a BSS profile that may identify the start or end of the BSS profile. For example, a capabilities element (which also may be referred to as a NonTxBSSID Cap element) may indicate the start of a BSS profile.

In some implementations, as shown in the example management frame 301, the management frame generation module 172 may include a fixed element 372 as the last element of a split BSS profile (such as the split BSS profile 322) to indicate to the STA that is processing the partial BSS profile 322A in the first Multiple BSSID element 320A to also process the partial BSS profile 322B in the next Multiple BSSID element (the second Multiple BSSID element 320B). When the STA processes the partial BSS profile 322B (that is, the second portion of the split BSS profile 322), the STA may determine it has finished processing the split BSS profile 322 when it processes the fixed element 372, which may be positioned as the last element of the partial BSS profile 322B. In some implementations, a new element may be defined in a standard specification to serve as the fixed element 372 that identifies the end (or last element) of a BSS profile, and also implicitly serves as an indicator when the BSS profile is split or straddled across two or more Multiple BSSID elements. In some implementations, instead of being the last element of the split BSS profile 322, the fixed element 372 may be the first element of the next BSS profile, such as the BSS profile 323, which identifies the start of the next BSS profile (and implicitly serves as an indicator when the BSS profile is split or straddled across two or more Multiple BSSID elements). After the STA processes the partial BSS profile 322B (that is, the second portion of the split BSS profile 322), the STA may determine it has finished processing the split BSS profile 322 when it processes the fixed element 372, which may be positioned as the first element of the BSS profile 323. In some implementations, the fixed element 372 may be an existing element in a BSS profile that may identify the start the BSS profile. For example, the fixed element 372 may be a capabilities element (which also may be referred to as a NonTxBSSID Cap element). In some implementations, the fixed element 372 may be a new element that may be defined in a standard specification to serve as the fixed element 372 that identifies the start of a BSS profile.

In some implementations, as shown in the example management frame 302, the management frame generation module 172 may include an anchor element 382 as the first element of the second Multiple BSSID element when a BSS profile is a split or straddled BSS profile. Similarly as shown in management frame 301, the BSS profile 322 is split into a partial BSS profile 322A in the first Multiple BSSID element 320A and a partial BSS profile 322B in a second Multiple BSSID element 302B. The anchor element 382 may be the first element in the partial BSS profile 322B, which also may be the first element of the second Multiple BSSID element 320B. The anchor element 382 may indicate to a STA that completes the processing of the first Multiple BSSID element 320A and begins processing the second Multiple BSSID element 320B that the partial BSS profile 322B is part of the split BSS profile 322. The anchor element 382 may be a Multiple BSSID Index element, or may be a new element that is defined in a standard specification as an anchor between two Multiple BSSID elements to indicate a BSS profile is split between the two Multiple BSSID elements.

In some implementations, as shown in the example management frame 303, the management frame generation module 172 may include an anchor element 392 as the last element of the first Multiple BSSID element 320A, which may also be the last element of the partial BSS profile 322A. The anchor element 392 may indicate to a STA that finishes processing the first Multiple BSSID element 320A to process the second Multiple BSSID element 320B because the BSS profile 322 is split between the two Multiple BSSID elements. In some implementations, a new element may be defined in a standard specification to serve as the anchor element 392 that explicitly indicates when the BSS profile is split or straddled across two or more Multiple BSSID elements.

Figure 4:
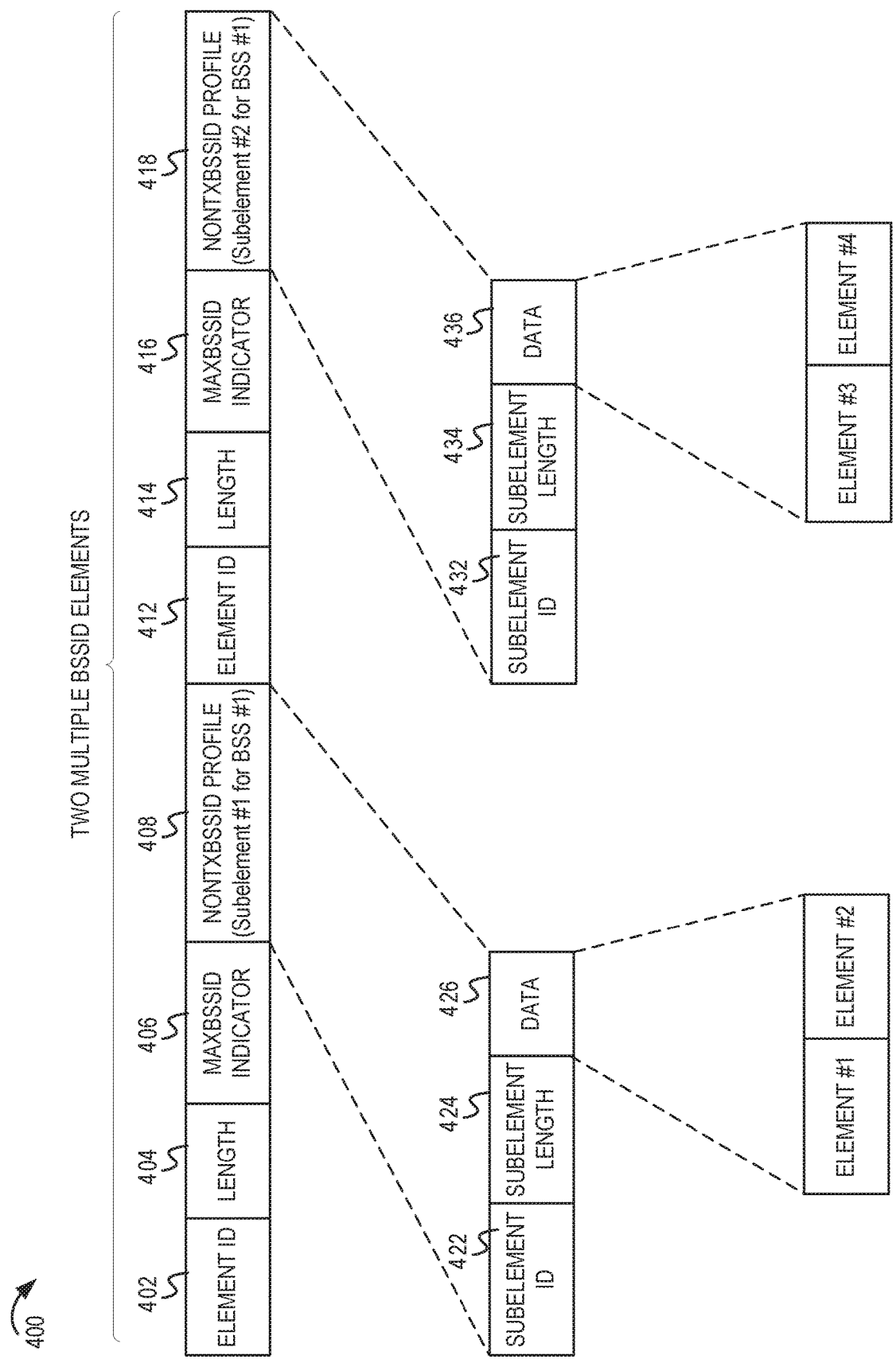
FIG. 4 depicts an example split BSS profile that is split across two Multiple BSSID elements of a management frame.

FIG. 4 depicts an example split BSS profile that is split across two Multiple BSSID elements of a management frame 400. The management frame 400 may include a split BSS profile for the BSS #1 that includes a Subelement #1 and a Subelement #2.

In some implementations, at least a portion the first Multiple BSSID element may include the element ID 402, the length 404, the MaxBSSID indicator 406, and the NonTxBSSID Profile 408 (which also may be referred to as BSS Profile 408), and at least a portion the second Multiple BSSID element may include the element ID 412, the length 414, the MaxBSSID indicator 416, and the NonTxBSSID Profile 418 (which also may be referred to as BSS Profile 418). The NonTxBSSID profile 408 associated with subelement #1 may include a subelement ID 422, a subelement length 424, and data 426. The data 426 may include element #1 and element #2 of the split BSS profile. The NonTxBSSID profile 418 associated with subelement #2 may include a subelement ID 432, a subelement length 434, and data 436. The data 436 may include element #3 and element #4 of the split BSS profile.

In some implementations, the split BSS profile may be the combination of the NonTxBSSID Profile 408 and the NonTxBSSID Profile 418. The NonTxBSSID Profile 408 may include a first portion of the split BSS profile having a subelement length 424 (a partial profile length) that includes the element #1 and the element #2 of the split BSS profile. The NonTxBSSID Profile 418 may include a second (or remaining) portion of the split BSS profile having a subelement length 434 (a pending or remaining profile length) that includes the element #3 and the element #4 of the split BSS profile.

In one example that does not include split or straddled profiles, assuming the information of four BSS profiles fits in one Multiple BSSID element, the unfragmented sequence may be the following:
<Element ID=71>, <LENGTH>, <MaxBSSID Indicator>, <Optional Subelements:
ID=0, LENGTH=length of sub-element <=profile length>// NonTxBSSID #1
[NonTxBSSID Cap element, SSID, Multiple BSSID-Index element, element 1, element 2 . . . element n],
ID=0, LENGTH=length of sub-element <=profile length>NonTxBSSID #2
[NonTxBSSID Cap element, SSID, Multiple BSSID-Index element, element 1, element 2 . . . element m],
ID=0, LENGTH=length of sub-element <=profile length>NonTxBSSID #3
[NonTxBSSID Cap element, SSID, Multiple BSSID-Index element, element 1, element 2 . . . element k],
ID=0, LENGTH=length of sub-element <=profile length>NonTxBSSID #4
[NonTxBSSID Cap element, SSID, Multiple BSSID-Index element, element 1, element 2 . . . element p]}>

In one example that includes split or straddled profiles, for example when one of the profiles (such as the third BSS profile associated with NonTxBSSID #3) doesn't fit within one Multiple BSSID element and instead carries over to the next Multiple BSSID element of the management frame (such as the split BSS profile of the management frame 400), the fragmented sequence may be the following:
<Element ID=71>, <LENGTH>, <MaxBSSID Indicator>, <Optional Subelements:
ID=0, LENGTH=length of sub-element <=profile length>NonTxBSSID #1
[NonTxBSSID Cap element, SSID, Multiple BSSID-Index element, element 1, element 2 . . . element n],
ID=0, LENGTH=length of sub-element <=profile length>NonTxBSSID #2
[NonTxBSSID Cap element, SSID, Multiple BSSID-Index element, element 1, element 2 . . . element m],
ID=0, LENGTH=length of sub-element <=partial profile length>{//NonTxBSSID #3
[NonTxBSSID Cap element, SSID, Multiple BSSID-Index element, element 1]}>
<Element ID=71>, <LENGTH>, <MaxBSSID Indicator>, <Optional Subelements:
ID=0, LENGTH=length of sub-element <=pending profile length>NonTxBSSID #3 [element 2 . . . element k],
ID=0, LENGTH=length of sub-element <=profile length>{// NonTxBSSID #4
[NonTxBSSID Cap element, SSID, Multiple BSSID-Index element, element 1, element 2 . . . element p]}>

As shown, the first portion of the split BSS profile (which is shown as the BSS profile of the NonTxBSSID #3) may include one or more elements (such as element 1) and may have a partial profile length, and the second portion of the split BSS profile may include the remaining one or more elements (such as element 2 through element k) and may have a pending (or remaining) profile length.

The types of management frames, profiles, elements, and indicators are merely examples. In some other implementations, a different management frame, profiles, elements, and indicators may be used. In some implementations, the use of the elements and indicators may be specified in a standard specification. For example, some implementations of the elements and indicators may be mandated for IEEE 802.11ax devices. In some implementations, some of the elements and indicators may be new defined elements or indicators. In some implementations, some of the elements or indicators may be repurposed elements or indicators.

FIG. 5 depicts an example flowchart of a wireless node analyzing a received management frame. The flowchart 500 begins at block 510. At block 510, a wireless node may obtain a first management frame from a WLAN apparatus that is operating (or hosting) multiple VAPs respectively corresponding to multiple BSSs. The multiple VAPs may include at least a first VAP for a first BSS and one or more other VAPs for one or more other BSSs. The first VAP may correspond to a TxBSSID and may advertise information regarding the one or more other VAPs associated with the one or more other BSSs, which are referred to as NonTxBSSIDs.

At block 520, the wireless node may determine whether the first management frame includes a BSS profile of a BSS associated with the wireless node based, at least in part, on an arrangement of a plurality of BSS profiles within one or more management frames transmitted by the WLAN apparatus. The BSS may be one of the multiple BSSs and the BSS profile may be one of the plurality of BSS profiles. In some implementations, the arrangement of the plurality of BSS profiles may include one or more of a DTIM interval, a repeating pattern of BSS profiles included across a repeating sequence of management frames, a Multiple BSSID Index element, among others.

At block 530, the wireless node may determine to further process the first management frame based, at least in part, on a determination that the first management frame includes the BSS profile of the BSS associated with the wireless node. In some implementations, in response to determining that the first management frame includes the BSS profile of the BSS associated with the wireless node, the wireless node may determine whether the BSS profile of the BSS has changed compared to a previous instance of the BSS profile that was included in a previously received management frame. The wireless node may determine to further process the first management frame in response to determining the first management frame includes the BSS profile and determining that the BSS profile has changed compared to the previous instance of the BSS profile.

FIG. 6 depicts an example flowchart of a wireless node preparing one or more management frames for transmission. The flowchart 600 begins at block 610. At block 610, a wireless node may operate (or host) multiple VAPs associated with corresponding multiple BSSs, the multiple VAPs including at least a first VAP for a first BSS and a plurality of other VAPs for a plurality of other BSSs. The first VAP may correspond to a TxBSSID and may advertise information regarding the one or more other VAPs associated with the one or more other BSSs, which are referred to as NonTxBSSIDs.

At block 620, the wireless node may determine an arrangement of a plurality of BSS profiles associated with the plurality of other BSSs within one or more management frames. As described above, the arrangement of the plurality of BSS profiles may include a repeating pattern of management frame transmissions based on DTIM intervals, a repeating pattern of BSS profiles included across a repeating sequence of management frames, among others.

At block 630, the wireless node may generate the one or more management frames for transmission based, at least in part, on the arrangement of the plurality of BSS profiles.

Figure 7:
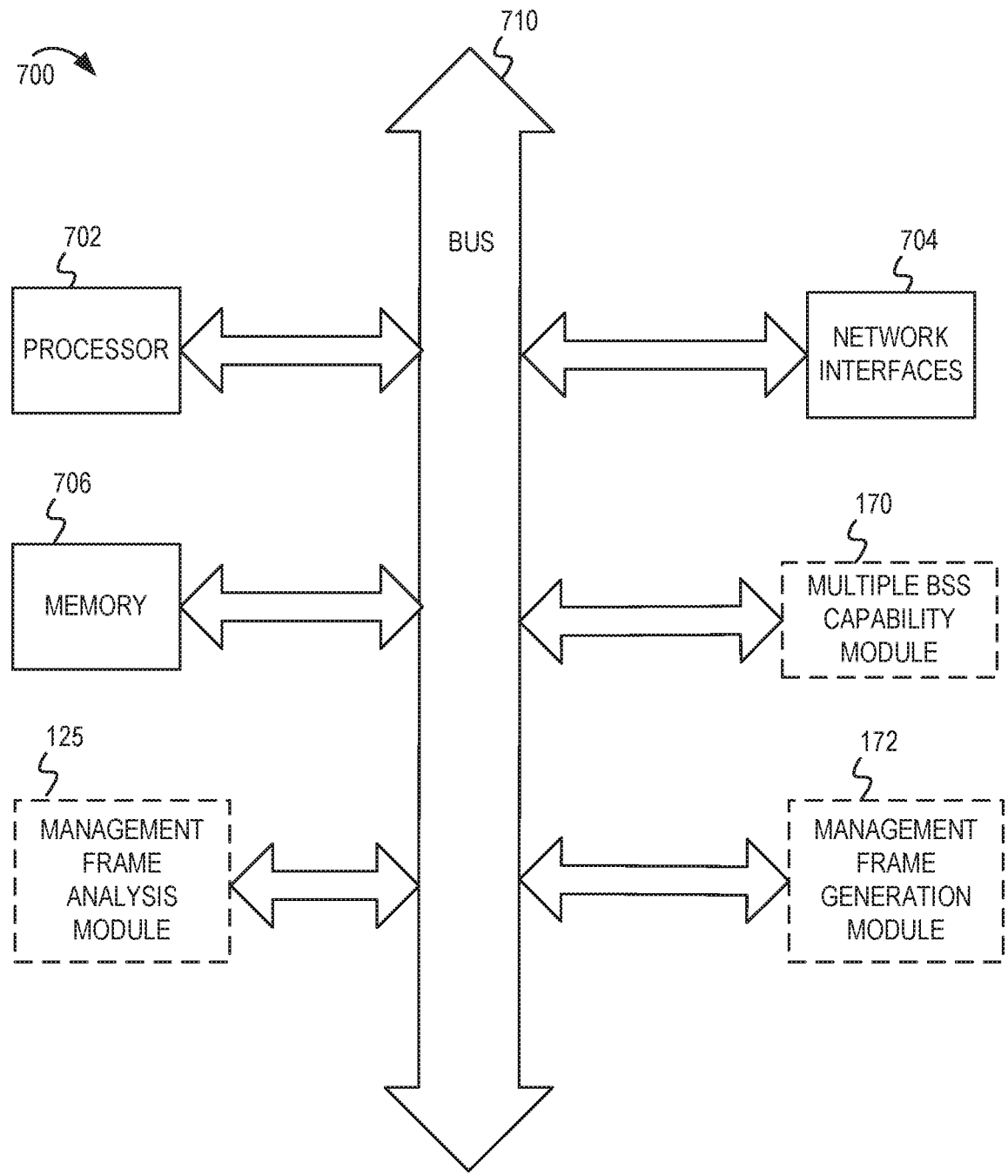
FIG. 7 shows a block diagram of an example electronic device for implementing aspects of this disclosure.

FIG. 7 shows a block diagram of an example electronic device for implementing aspects of this disclosure. In some implementations, the electronic device 700 may be a WLAN apparatus (such as an AP that implements a plurality of VAPs). In some implementations, the electronic device 700 may be a client STA. The electronic device 700 can include a processor unit 702 (possibly including multiple processors, multiple cores, multiple nodes, or implementing multi-threading, etc.). The electronic device 700 also can include a memory unit 706. The memory unit 706 may be system memory or any one or more of the possible realizations of computer-readable media described herein. The electronic device 700 also can include a bus 710 (such as PCI, ISA, PCI-Express, HyperTransport®, InfiniBand®, NuBus,®

AHB, AXI, etc.), and a network interface 704 that can include at least one of a wireless network interface (such as a WLAN interface, a Bluetooth® interface, a WiMAX® interface, a ZigBee® interface, a Wireless USB interface, etc.) and a wired network interface (such as an Ethernet interface, a powerline communication interface, etc.). In some implementations, the electronic device 700 may support multiple network interfaces—each of which is configured to couple the electronic device 700 to a different communication network.

When the electronic device 700 is a WLAN apparatus, the electronic device 700 may include a Multiple BSS Capability module 170 and a management frame generation module 172, similar to those described in FIG. 1. When the electronic device 700 is a client STA, the electronic device 700 may include a management frame analysis module 125, similar to the module described in FIG. 1. In some implementations, one or more of the Multiple BSS Capability module 170, the management frame generation module 172, and the management frame analysis module 125 can be distributed within the processor unit 702, the memory unit 706, the bus 710, and the network interfaces 704. In some implementations, one or more of the Multiple BSS Capability module 170, the management frame generation module 172, and the management frame analysis module 125 (and optionally one or more of the processor 702, memory 706, and network interfaces 704) may be part of a wireless chipset of the electronic device 700. In some implementations, the wireless chipset also may be generally referred to as a wireless node, a wireless apparatus, or a communication unit (or module). In some implementations, the electronic device 700 also may be generally referred to as a wireless node or a wireless apparatus.

The memory unit 706 can include computer instructions executable by the processor unit 702 to implement the functionality of the implementations described in FIGS. 1-6. Any one of these functionalities may be partially (or entirely) implemented in hardware or on the processor unit 702. For example, the functionality may be implemented with an application specific integrated circuit, in logic implemented in the processor unit 702, in a co-processor on a peripheral device or card, in one or more additional processors or controllers, etc. Further, realizations may include fewer or additional components not illustrated in FIG. 7 (such as video cards, audio cards, additional network interfaces, peripheral devices, processors, etc.). The processor unit 702, the memory unit 706, and the network interface 704 are coupled to the bus 710. Although illustrated as being coupled to the bus 710, the memory unit 706 may be coupled to the processor unit 702.

FIGS. 1-7 and the operations described herein are examples meant to aid in understanding example implementations and should not be used to limit the potential implementations or limit the scope of the claims. Some implementations may perform additional operations, fewer operations, operations in parallel or in a different order, and some operations differently.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described throughout. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described herein. A general-purpose processor may be a microprocessor, or, any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-Ray™ disc where disks usually reproduce data magnetically, while discs reproduce data optically with lasers. Combinations also can be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A wireless node, comprising:
   an interface configured to obtain a first management frame from a wireless local area network (WLAN) apparatus, the WLAN apparatus operating multiple virtual access points (VAPs) respectively corresponding to multiple basic service sets (BSSs); and
   a first processor configured to:
      determine whether the first management frame includes a BSS profile of a BSS associated with the wireless node based, at least in part, on an arrangement of a plurality of BSS profiles within one or more management frames transmitted by the WLAN apparatus, the BSS being one of the multiple BSSs and the BSS profile being one of the plurality of BSS profiles, and
      determine whether the BSS profile is split between a first Multiple BSSID element of the first management frame and a second Multiple BSSID element of the first management frame in response to a determination that the first management frame includes the BSS profile of the BSS associated with the wireless node.

2. The wireless node of claim 1, wherein the first processor is further configured to:
   determine to discard the first management frame without further processing the first management frame based, at least in part, on a determination that the first management frame does not include the BSS profile of the BSS associated with the wireless node.

3. The wireless node of claim 1, in response to the determination that the first management frame includes the BSS profile of the BSS associated with the wireless node, the first processor is further configured to:
   determine whether the BSS profile of the BSS has changed compared to a previous instance of the BSS profile that was included in a previously received management frame, and
   determine to further process the first management frame in response to a determination that the BSS profile has changed compared to the previous instance of the BSS profile.

4. The wireless node of claim 3, wherein the first processor is further configured to:
   determine to discard the first management frame without further processing the first management frame in response to a determination that the BSS profile has not changed compared to the previous instance of the BSS profile.

5. The wireless node of claim 1, wherein the first processor configured to determine whether the first management frame includes the BSS profile of the BSS associated with the wireless node based, at least in part, on the arrangement of the plurality of BSS profiles within one or more management frames transmitted by the WLAN apparatus further comprises the first processor configured to:
   determine the first management frame includes the BSS profile of the BSS based, at least in part, on a repeating pattern of the plurality of BSS profiles included across a repeating sequence of management frames transmitted by the WLAN apparatus.

6. The wireless node of claim 1, wherein the first processor is further configured to:
   monitor management frames transmitted by the WLAN apparatus;
   determine a repeating pattern of the plurality of BSS profiles included across a repeating sequence of the management frames transmitted by the WLAN apparatus based on the monitoring of the management frames; and
   determine the first management frame includes the BSS profile of the BSS based, at least in part, on the repeating pattern of the plurality of BSS profiles included across the repeating sequence of the management frames.

7. The wireless node of claim 1, wherein the first processor is further configured to:
   determine the first management frame includes the BSS profile of the BSS based, at least in part, on a determination that the first management frame is a Delivery Traffic Indication Message (DTIM) management frame.

8. The wireless node of claim 1, wherein the first processor is further configured to:
   determine a DTIM interval associated with the BSS profile of the BSS associated with the wireless node;
   determine a repeating pattern of transmission of management frames that include the BSS profile of the BSS based, at least in part, on the DTIM interval; and
   determine the first management frame includes the BSS profile of the BSS based, at least in part, on a determination that the first management frame is one of the management frames in the repeating pattern of transmission of management frames that include the BSS profile of the BSS.

9. The wireless node of claim 1, wherein the first processor is further configured to wake up a host processor to further process the first management frame in response to the determination that the first management frame includes the BSS profile of the BSS associated with the wireless node.

10. The wireless node of claim 1 wherein the first processor is further configured to:
    determine the first Multiple BSSID element or the second Multiple BSSID element includes an indicator element that indicates the BSS profile is split between the first Multiple BSSID element and the second Multiple BSSID element.

11. The wireless node of claim 1, wherein the first processor is further configured to:
    determine the first management frame includes at least a subset of the plurality of BSS profiles based, at least in part, on the arrangement of the plurality of BSS profiles within one or more management frames transmitted by the WLAN apparatus, the subset of the plurality of BSS profiles including the BSS profile.

12. The wireless node of claim 1, in response to the determination that the first management frame includes the BSS profile of the BSS associated with the wireless node, the first processor is further configured to:
    identify a first indicator element in a first portion of the BSS profile included in a first Multiple BSSID element of the first management frame, the first indicator element indicating a start of the BSS profile;
    determine a second portion of the BSS profile included in a second Multiple BSSID element of the first management frame does not include an indicator element;
    identify a second indicator element in a next BSS profile included in the second Multiple BSSID element, the second indicator element indicating a start of the next BSS profile; and
    determine the BSS profile is split between the first Multiple BSSID element and the second Multiple BSSID element based, at least in part, on an identification of the first indicator element, an identification of the second indicator element, and a determination that the second portion of the BSS profile included in the second Multiple BSSID element does not include an indicator element.

13. The wireless node of claim 1, further comprising:
    a receiver configured to receive the first management frame, wherein the wireless node is configured as a station.

14. A wireless node, comprising:
    a processor configured to:
    operate multiple virtual access points (VAPs) associated with corresponding multiple basis service sets (BSSs), the multiple VAPs including at least a first VAP for a first BSS and a plurality of other VAPs for a plurality of other BSSs;

determine an arrangement of a plurality of BSS profiles associated with the plurality of other BSSs within one or more management frames including a first management frame; and split a first BSS profile of the plurality of BSS profiles between a first Multiple BSSID element of the first management frame and a second Multiple BSSID element of the first management frame; and generate the one or more management frames including the first management frame; and an interface configured to output the one or more management frames including the first management frame for transmission to one or more wireless local area network (WLAN) apparatuses associated with the first BSS and at least one of the plurality of other BSSs.

15. The wireless node of claim 14, wherein the processor configured to determine the arrangement of the plurality of BSS profiles associated with the plurality of other BSSs within the one or more management frames further comprises the processor configured to:

determine a repeating pattern of the plurality of BSS profiles to be included across a repeating sequence of management frames; and generate the repeating sequence of management frames for transmission via the interface.

16. The wireless node of claim 14, wherein the processor configured to determine the arrangement of the plurality of BSS profiles associated with the plurality of other BSSs within the one or more management frames further comprises the processor configured to:

determine Delivery Traffic Indication Message (DTIM) intervals associated with the plurality of BSS profiles; and determine a repeating pattern of transmission of management frames based, at least in part, on the DTIM intervals, wherein each management frame of the repeating pattern of transmission of management frames includes one or more of the plurality of BSS profiles.

17. The wireless node of claim 14, wherein the processor configured to determine the arrangement of the plurality of BSS profiles associated with the plurality of other BSSs within the one or more management frames further comprises the processor configured to:

determine a same DTIM interval for each of the plurality of BSS profiles; and generate a DTIM management frame for transmission that includes the plurality of BSS profiles.

18. The wireless node of claim 14, wherein the processor is further configured to:

determine whether a second BSS profile of the plurality of BSS profiles has changed compared to a previous instance of the second BSS profile, the second BSS profile associated with a second BSS; and determine to include the second BSS profile in a next management frame associated with the second BSS in response to determining the second BSS profile has changed.

19. The wireless node of claim 14, wherein a first portion of the first BSS profile is included in the first Multiple BSSID element of the first management frame and a second portion of the first BSS profile is included in the second Multiple BSSID element of the first management frame.

20. The wireless node of claim 19, wherein the first portion of the first BSS profile included in the first Multiple BSSID element includes a first indicator element that indicates a start of the first BSS profile, the second portion of the first BSS profile included in the second Multiple BSSID element does not include an indicator element, and a second BSS profile included in the second Multiple BSSID element includes a second indicator element that indicates a start of the second BSS profile.

21. The wireless node of claim 20, wherein the first indicator element is a first capabilities element associated with the first BSS profile, and the second indicator element is a second capabilities element associated with the second BSS profile.

22. The wireless node of claim 14, further comprising:

a transmitter configured to transmit the one or more management frames, wherein the wireless node is configured as an access point.

23. A method performed by a wireless node, comprising:

obtaining a first management frame from a wireless local area network (WLAN) apparatus, the WLAN apparatus operating multiple virtual access points (VAPs) respectively corresponding to multiple basic service sets (BSSs);

determining whether the first management frame includes a BSS profile of a BSS associated with the wireless node based, at least in part, on an arrangement of a plurality of BSS profiles within one or more management frames transmitted by the WLAN apparatus, the BSS being one of the multiple BSSs and the BSS profile being one of the plurality of BSS profiles; and determining whether the BSS profile is split between a first Multiple BSSID element of the first management frame and a second Multiple BSSID element of the first management frame in response to a determination that the first management frame includes the BSS profile of the BSS associated with the wireless node.

24. The method of claim 23, further comprising:

in response to determining that the first management frame includes the BSS profile of the BSS associated with the wireless node, determining whether the BSS profile of the BSS has changed compared to a previous instance of the BSS profile that was included in a previously received management frame, and determining to further process the first management frame is in response to determining that the BSS profile has changed compared to the previous instance of the BSS profile.

25. The method of claim 23, wherein determining whether the first management frame includes the BSS profile of the BSS associated with the wireless node based, at least in part, on the arrangement of the plurality of BSS profiles within one or more management frames transmitted by the WLAN apparatus comprises:

determining the first management frame includes the BSS profile of the BSS based, at least in part, on a repeating pattern of the plurality of BSS profiles included across a repeating sequence of management frames transmitted by the WLAN apparatus.

26. A method performed by a wireless node, comprising:

operating, at the wireless node, multiple virtual access points (VAPs) associated with corresponding multiple basis service sets (BSSs), the multiple VAPs including at least a first VAP for a first BSS and a plurality of other VAPs for a plurality of other BSSs;

determining an arrangement of a plurality of BSS profiles associated with the plurality of other BSSs within one or more management frames including a first management frame;

splitting a first BSS profile of the plurality of BSS profiles between a first Multiple BSSID element of the first management frame and a second Multiple BSSID element of the first management frame; and generating the one or more management frames including the first management frame for transmission.

27. The method of claim 26, wherein determining the arrangement of the plurality of BSS profiles associated with the plurality of other BSSs within the one or more management frames comprises:

determining a repeating pattern of the plurality of BSS profiles to be included across a repeating sequence of management frames; and generating the repeating sequence of management frames for transmission.

* * * * *